United States Patent [19]

Florindez

[11] Patent Number: 5,133,447
[45] Date of Patent: Jul. 28, 1992

[54] RECIPROCATING INDEXING MACHINE FOR BAKERY PANS

[76] Inventor: Augusto Florindez, 13029 Ocaso, La Mirada, Calif. 90638

[21] Appl. No.: 545,409

[22] Filed: Jun. 28, 1990

Related U.S. Application Data

[63] Continuation-in-part of Ser. No. 356,118, May 24, 1989, Pat. No. 4,945,825.

[51] Int. Cl.⁵ .............................................. B65G 47/00
[52] U.S. Cl. .................................... 198/463.4; 198/431; 53/251; 53/534; 99/353; 99/427; 99/443 C
[58] Field of Search ................. 99/334, 352, 353, 426, 99/427, 440, 443 C; 53/246, 251, 534, 539; 198/418.6, 431, 463.4, 465.1

[56] References Cited

U.S. PATENT DOCUMENTS

| | | | |
|---|---|---|---|
| 1,715,968 | 6/1929 | Weber et al. | 53/246 |
| 2,536,249 | 1/1951 | Archer | 198/431 |
| 2,540,945 | 2/1951 | Hart | 198/431 |
| 2,549,823 | 3/1952 | Rhodes | 53/246 |
| 3,225,513 | 12/1965 | Ehe | 198/431 |
| 3,249,204 | 5/1966 | Coffaro et al. | 198/431 |
| 4,019,621 | 4/1977 | Hanson | 53/534 |
| 4,173,107 | 11/1979 | Wilson | 53/534 |
| 4,226,073 | 10/1980 | Rose et al. | 53/534 |
| 4,304,325 | 12/1981 | May et al. | 198/418.6 |
| 4,316,534 | 2/1982 | Cummins | 198/431 |

FOREIGN PATENT DOCUMENTS

| | | | |
|---|---|---|---|
| 213415 | 3/1958 | Australia | 99/443 C |
| 255553 | 7/1926 | United Kingdom | 99/443 C |

*Primary Examiner*—Harvey C. Hornsby
*Assistant Examiner*—Mark Spisich

[57] ABSTRACT

Disclosed is a machine for advancing bakery pans in in step wise fashion along a production line. The machine includes an arm carrying spaced apart indexing fingers having rollers at their lower ends. The arm is mounted on an indexer carriage which may be raised or lowered so that the rollers will contact the trailing lip of an individual pan. The arm moves reciprocally with each cycle of the production line, raising the arm to allow the pan to be advanced one step or interval, which is equal to the distance between fingers, and then lowering the arm to bring the next in line finger into contact with the trailing lip of the pan.

5 Claims, 5 Drawing Sheets

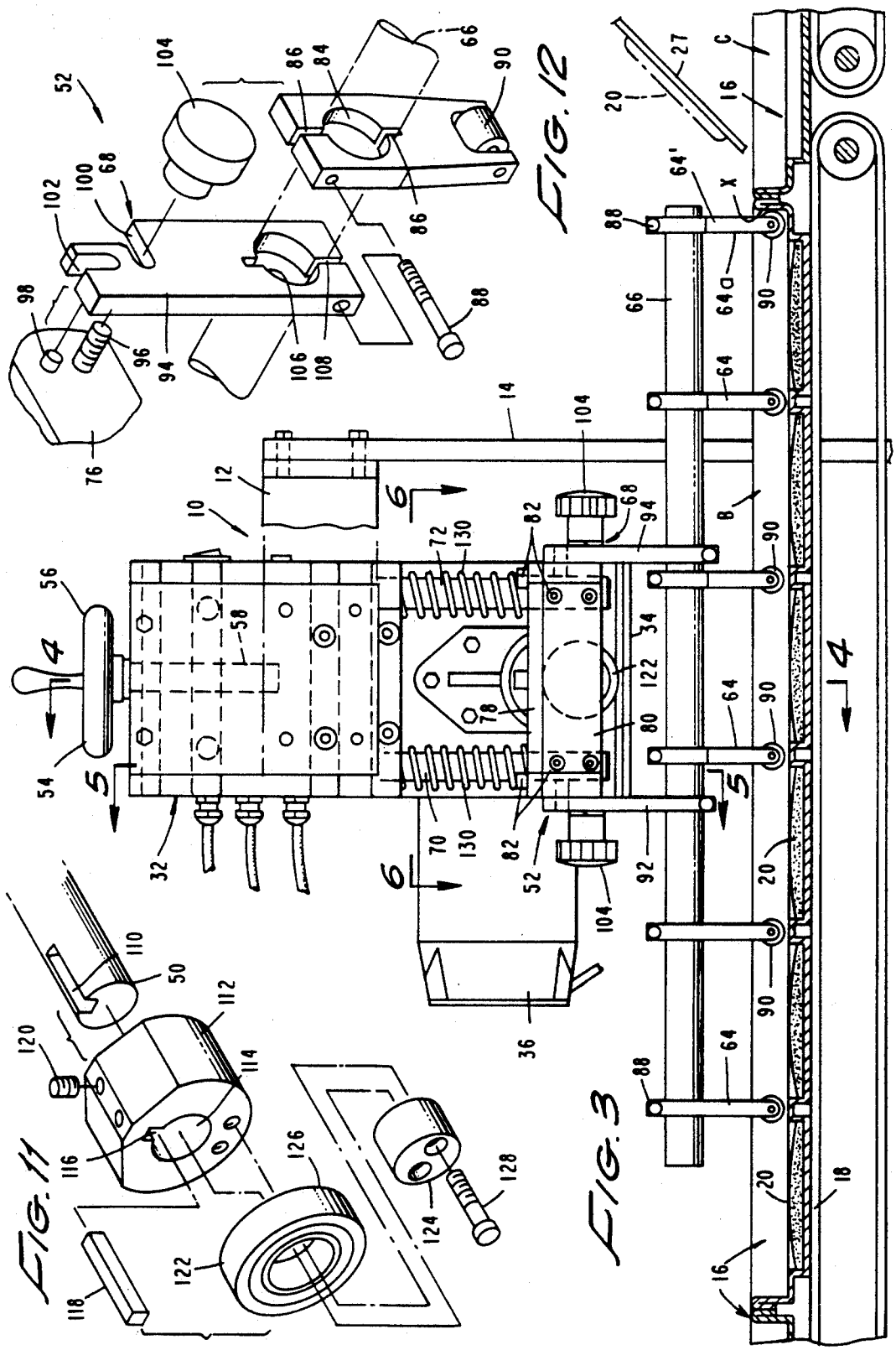

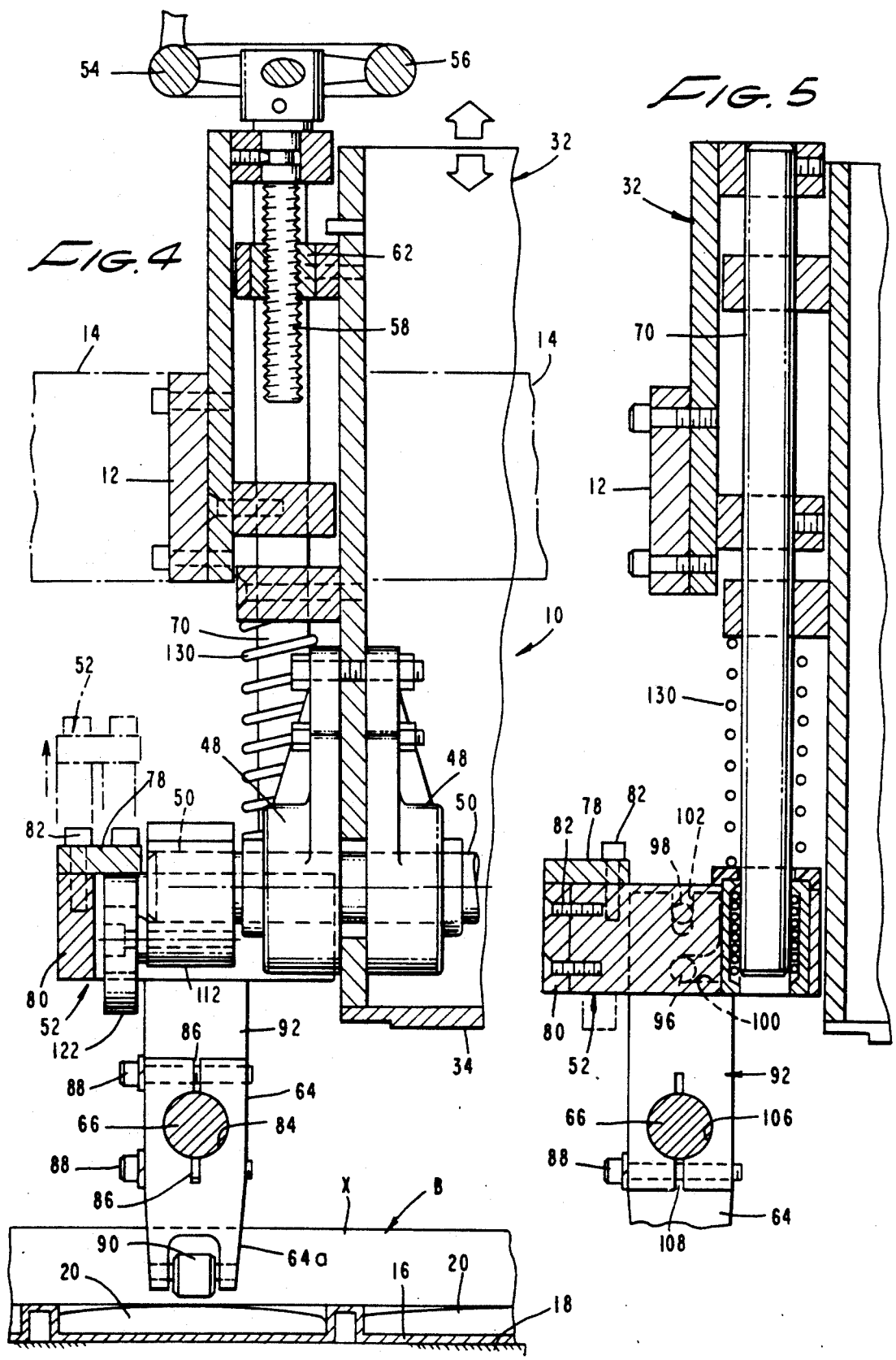

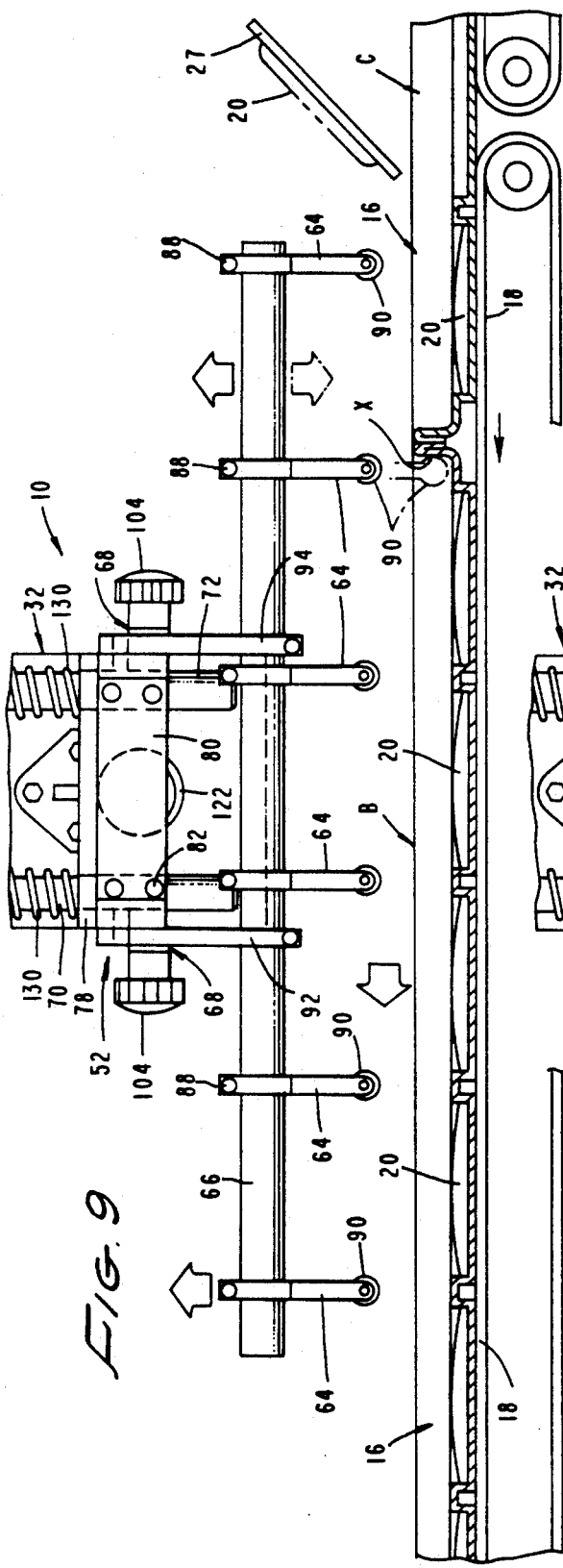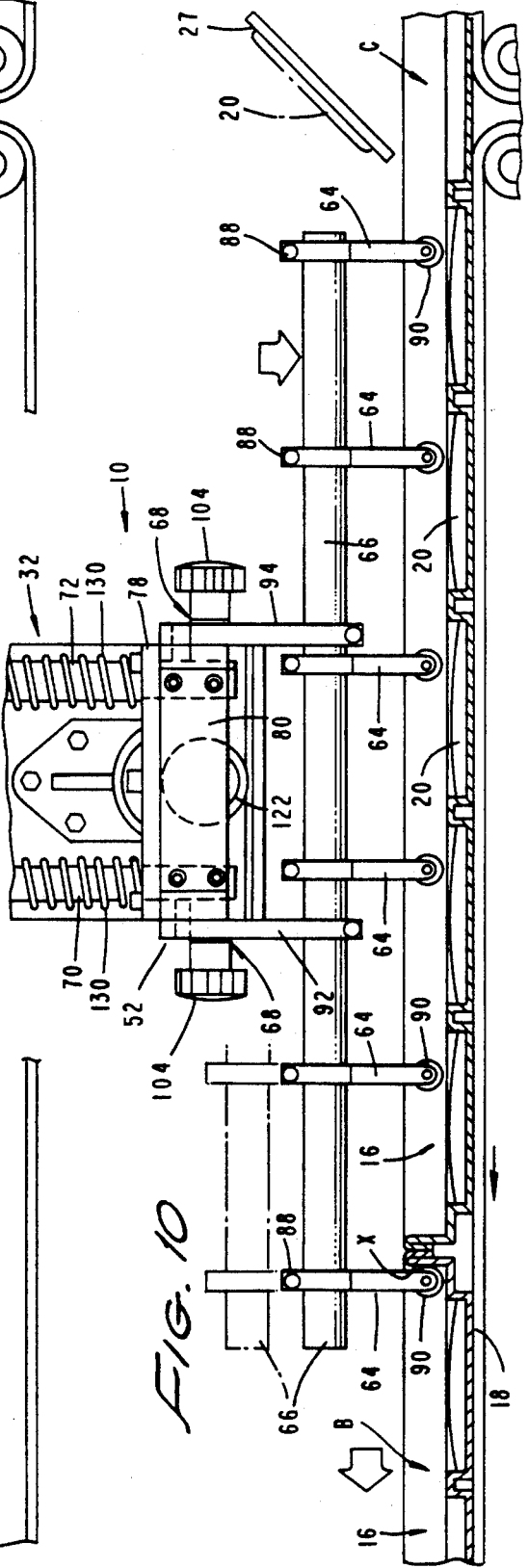

RECIPROCATING INDEXING MACHINE FOR BAKERY PANS

RELATED PATENT APPLICATION

This application is a continuation-in-part application of the parent U.S. patent application Ser. No. 07/356,118, filed May 24, 1989 and entitled, "Indexing Machine for Baking Pans," issued as U.S. Pat. No. 4,945,825. This parent application is incorporated herein by reference and made part of this continuation-in-part application.

BACKGROUND OF THE INVENTION

1. Field of the Invention

This invention relates to a machine for moving baking pans in a step-wise fashion as dough packets are deposited within the cup or cups of an individual pan.

2. Background Discussion

In the baking industry, it is common practice to utilize baking pans to make such products as hot dog buns, hamburger buns, bread loaves, and other bakery products. The baking pans are generally of a rectangular configuration and include rows of cups which hold dough packets. In the case of bread loaves, the pan only has one large cup. Dough packets are moved by conveyers and deposited in the baking pans automatically, row by row. As this is done, the pans are moved in a step-wise fashion along a predetermined path, pass the means for moving the dough packets to a point where they can be deposited in the pan. In other words, each cup of the pan has a dough packet placed in it, with the dough packets being deposited one row at a time in the baking pan, or with bread loaves, one pan at a time is filled with a single, large mass of dough.

Since different bakery products are made, different size baking pans are utilized. Each of these pans will have a different specific construction, although in general, each pan has a raised lip about the perimeter of the pan. The cups will be shaped differently, depending upon the of type product being made. For example, the cup will be oblong or elliptical when a hot dog bun is being made, and generally circular when a hamburger bun is being made. The rows of cups for hamburger buns will have different spacing them the rows of cups for the hot dog buns. As a consequence, the interval at which the pans are move will differ, depending upon the bakery product being made.

SUMMARY OF THE INVENTION

The present invention is a reciprocating indexing machine for bakery pans adapted to move the pans in a precise interval with each cycle of the production equipment. When different types of products are to be made, the machine is easily adapted to change the length of the step or interval that the pan is moved so it coincides with the type of product being made. This machine has a indexing arm from which extend indexing fingers with rollers at their ends. The arm is carried by an indexer carriage which moves the arm to different positions depending on the height of the pan being used. Mounted on the indexer carriage is a reciprocating subassembly to which the arm is removably mounted.

There are several features of this invention, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENT," one will understand how the features of this invention provide its advantages.

The first feature of this invention is the use of a arm which carries a plurality of indexing fingers or members that are spaced apart a distance corresponding to the step or interval that the bakery pans are moved along a pre-determined path of travel. These fingers are mounted on the arm so that they can be moved to different positions along the arm as required by the type of bakery product being made. Alternatively, the arm is mounted to be quickly disconnected and replaced with another arm which already has the indexing members positioned to accommodate a different type of bakery product.

The second feature of this invention is that a reciprocating subassembly is employed which carries the arm. This reciprocating subassembly is actuated by a cam mounted on the end of a drive shaft which moves through a 360° turn each time a dough packet or row of packets are placed in the bakery pan. This subassembly stops momentarily during each production cycle to allow the dough packets to be deposited in the cups of the pan.

The third feature of this invention is that the reciprocating subassembly is mounted on an indexer carriage. This indexer carriage is secured to a frame in a manner that allows the entire carriage to be raised or lowered relative to the predetermined path along which the bakery pans move. This allows the position of the lower ends of the indexing fingers to be spaced at different elevations above the predetermined path to accommodate bakery pans having lips at different heights.

The fourth feature of this invention is that the lower ends of the indexing fingers have roller elements thereon which engage the lip of the pan as the pan moves along its predetermined path of travel. Preferably, these rollers are made out of a plastic such as nylon which minimizes the friction between the lips of the pans and the rollers.

The fifth feature of this invention is that the reciprocating subassembly is spring-loaded so that if a stack of pans are nested together, they will push the subassembly upward against the action of the spring. Thus, pan nesting will not interfere with the operation of the machine which continues to advance the nested pans in a step wise fashion notwithstanding nesting.

BRIEF DESCRIPTION OF THE DRAWING

The preferred embodiment of this invention, illustrating all its features, will now be discussed in detail. This embodiment depicts the novel and non-obvious reciprocating indexing machine of this invention shown in the accompanying drawing, which is for illustrative purposes only. This drawing includes the following FIGS., with like numerals indicating like parts:

FIG. 3 is a front elevational view of the machine of this invention showing a trailing indexing finger holding the trailing lip of one of the baking pans.

FIG. 4 is a cross-sectional view taken along line 4—4 of FIG. 3.

FIG. 5 is a cross-sectional view taken along line 5—5 of FIG. 3.

FIG. 9 is a front elevational view showing the indexing arm moved to a raised position.

FIG. 10 is a view substantially similar to that shown in FIG. 9, with the indexing arm in a lowered position with the leading indexing finger holding the trailing lip of one of the baking pans.

FIG. 11 is an exploded perspective view of a cam member mounted to the end of a drive shaft.

FIG. 12 is an exploded perspective view of an arm support and an indexing finger mounted to the indexing arm.

DETAILED DESCRIPTION OF THE PREFERRED EMBODIMENT

Figure 1:
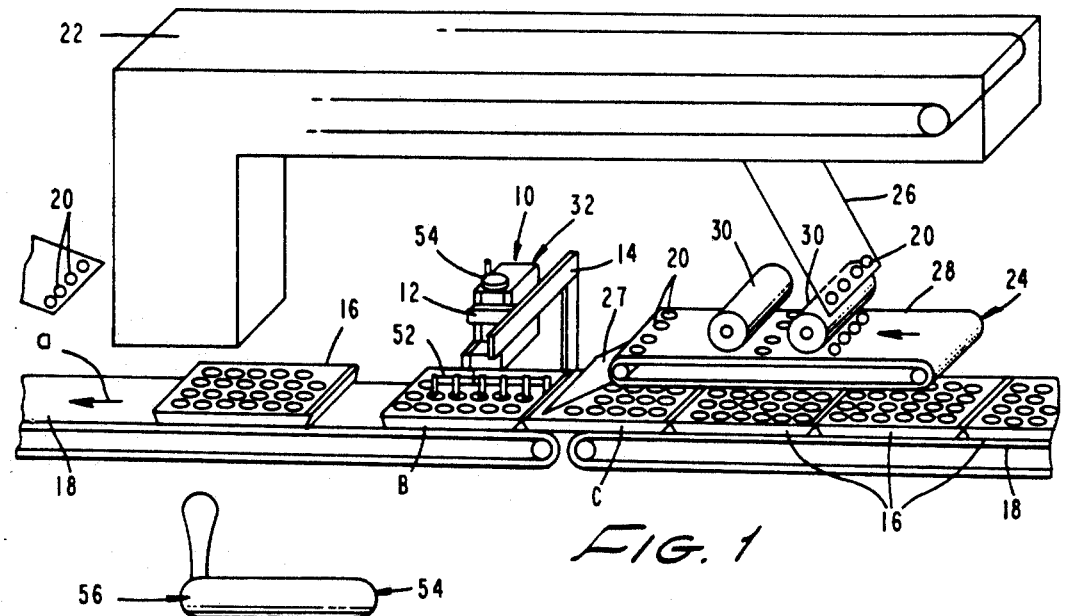
FIG. 1 is a simplified perspective view of the machine of this invention installed in a bakery production line making hamburger buns.
Figure 2:
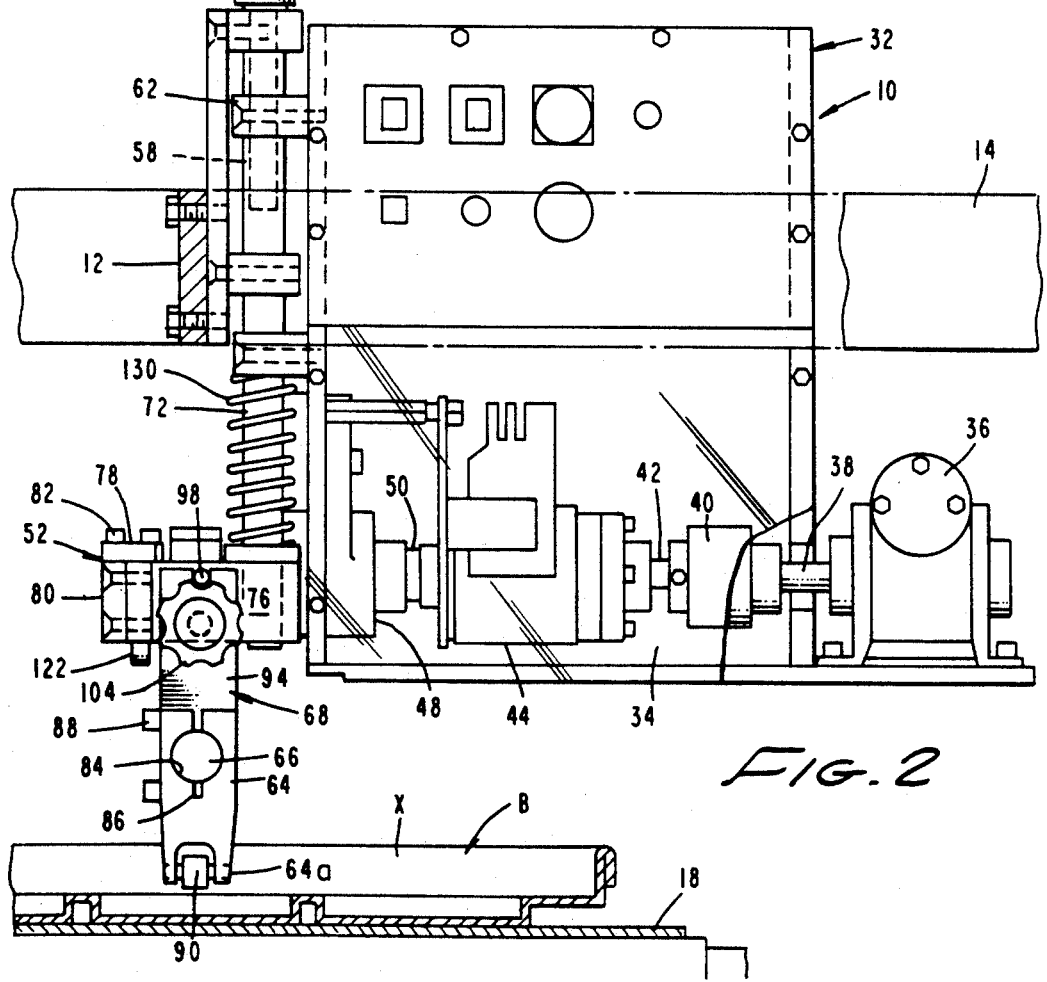
FIG. 2 is a side elevational view of the machine of this invention.
Figure 6:
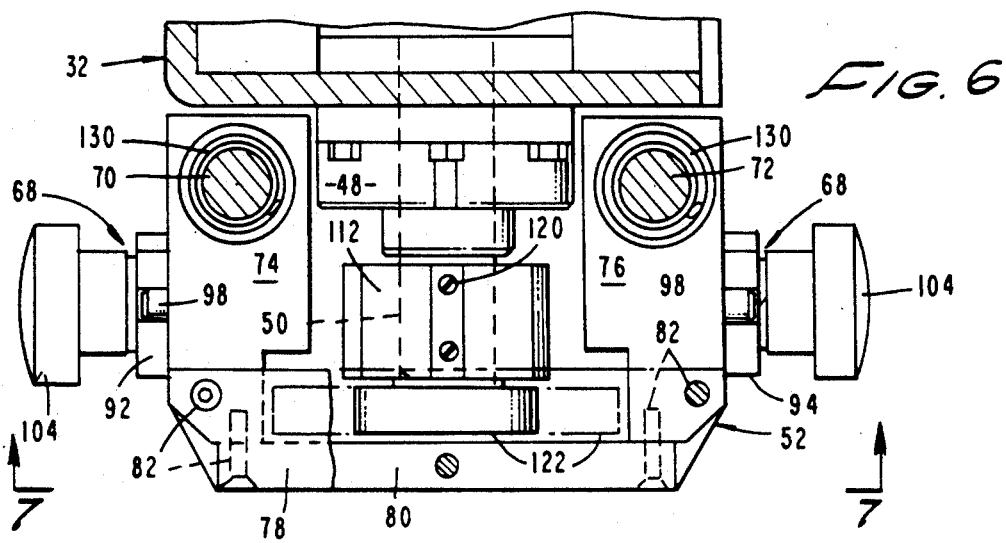
FIG. 6 is a cross-sectional view taken along line 6—6 of FIG. 3.

The reciprocating indexing machine 10 of this invention, as best illustrated in FIGS. 1 through 3, is mounted to a bracket 12 extending at a right angle from an L-frame 14 to position the reciprocating indexing machine above the path of travel indicated by arrow a of bakery pans 16 as they are moved by a table-top conveyer 18 along a production line. The pans 16 abut each other, with the leading end of one pan abutting the trailing end of the pan immediately ahead of it. Dough packets 20 are forwarded by a carousal-type conveyer 22 to an intermediate conveyer 24 and are directed by a ramp 26 to the top flight 28 of the intermediate conveyer, moving the dough packets pass drums 30 which flatten the packets. The dough packets 20 are generally circular, corresponding to hamburger-type buns. The rows of dough packets 20 are advanced incrementally in a stepwise fashion, row by row, past the machine 10 of this invention, sliding down a ramp 27 into the cups of pans 16. Each cycle of the production line produces a row of dough packets 20. With each cycle of the production line, the machine 10 of this invention moves through one cycle.

As best shown in FIGS. 2 and 3, the machine 10 of this invention includes an indexer carriage 32 attached to the bracket 12. This carriage 32 includes a floor 34 which supports a variable speed motor 36. The motor 36 has an output shaft 38 coupled to a safety clutch 40. The safety clutch 40 has an output shaft 42 connected to a one stop brake clutch 44, which in turn has an output shaft 50 held by back to back flange bearings 48. The motor 36 runs continuously, with the shafts 38 and 42 rotating continuously. The clutch 44 is energized when a row of dough packets 20 are advanced to a pan 16. The drive shaft 50 of the clutch 44 is connected to a reciprocating subassembly 52.

A crank 54 allows the indexer carriage 32 to be raised or lowered. This crank 52 includes a wheel 56 which is manually rotated having a threaded axle 58 received in a threaded bearing member 62 connected to the carriage 32. By turning the wheel 58 either clockwise or counterclockwise one controls the displacement of the indexer carriage 32 relative to the pans 16 traveling along the table-top conveyer 18. By raising or lowering the indexer carriage 32, the lower end 64a of an indexing finger 64' is raised or lowered relative, for example, to the trailing lip X of the baking pan B. The lip of each of the individual pans 16 is conextensive with the perimeter of the pan. As shown is FIG. 3, the indexer carriage 32 is raised or lowered to position the indexing fingers 64 to engage the trailing lips of the bakery pans.

As best illustrated in FIGS. 6 through 10, the reciprocating subassembly 52 includes an indexing arm 66, a quick disconnect coupling 68 for the indexing arm, and a pair of spaced-apart, generally vertical posts 70 and 72, which have their lower ends received, respectively, in bearing blocks 74 and 76 of the subassembly 52. These bearing blocks 74 and 76 are connected together by a top plate 78 and front plate 80, with set screws 82 holding these plates to the bearing blocks.

As illustrated in FIG. 12, the indexing arm 66 is a cylindrical rod mounted horizontally by the quick disconnect coupling 68. Moveably mounted along the indexing arm 66 are a series of indexing fingers 64 which are spaced apart a distance equal to the desired distance that the pans 16 will move a single step or interval. Each finger 64 includes a circular opening 84 near its top with a slot 86 extending across the opening and to the upper edge of the finger to allow the opening to expand and receive the indexing arm 66. A set screw 88, when tighten, constricts the opening 84 to lock the finger 64 to the arm 66 after the finger has been properly positioned along the arm. At the lower end of each finger 64 is a nylon roller 90 which is adapted to engage the trailing lip of a pan, for example lip X of the pan B, as illustrated in FIG. 3.

The quick disconnect coupling 68 includes a pair of arm supports 92 and 94, respectively, removably attached to the bearing blocks 74 and 76. The bearing blocks 74 and 76 each have a screw 96 and locator pin 98 extending outwardly that are received, respectively, in slots 100 and 102 in each of the arm supports 92 and 94. Lock knobs 104 are screwed onto the screws 96 to hold the indexing arm 66 in the horizontal position. Each arm support 92 and 94 has at its lower end a circular opening 106 with a slot 108 extending across the opening to the lower edge of the arm support. This slot 108 allows the opening 106 to expand to receive the indexing arm 66 which extends between both of the support arms 92 and 94. A tightened set screw 88 secures the arm 66 to the arm supports 92 and 94.

The reciprocating subassembly 52 is supported by the portion of the drive shaft 50 extending outwardly from the clutch 44. As illustrated in FIG. 11, this drive shaft 50 has a keyway 110 in its end. Mounted on this end of this drive shaft 50 is a cam holder 112 which includes a hole 114 having a slot 116 along its perimeter that receives a key 118 inserted in the slot 116 and the keyway 110. The key 118 is held in position by set screws 120. An annular cam 122 is mounted in an offset position on the face of the cam holder 112 by a circular wedge member 124 which fits tightly within a circular opening 126 in the cam and is secured to the cam holder by set screws 128.

Figure 7:
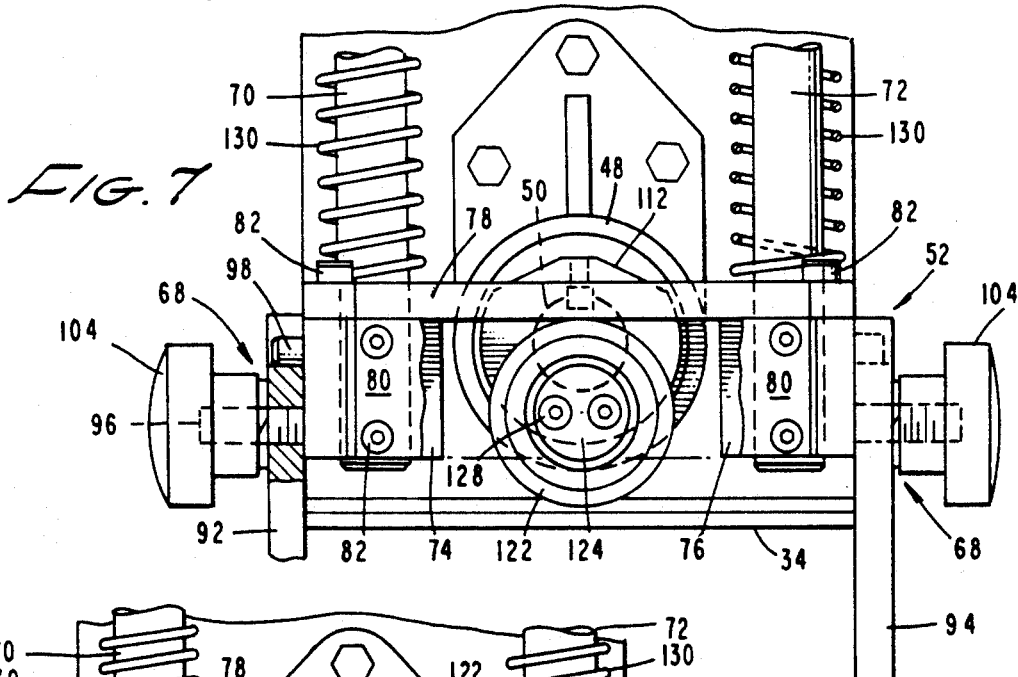
FIG. 7 is a cross-sectional view taken along line 7—7 of FIG. 6, showing the reciprocating subassembly in a lowered position.
Figure 8:
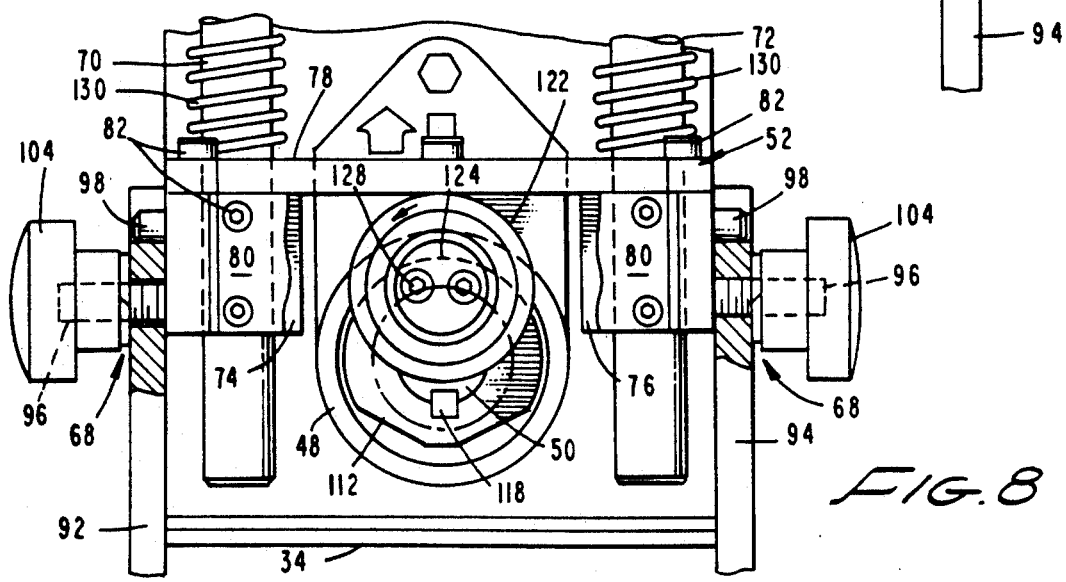
FIG. 8 is a view similar to FIG. 7, showing the reciprocating subassembly in a raised position.

With the reciprocating subassembly 52 attached to the end of the drive shaft 50, the cam 122 is positioned beneath the top plate 78 so that upon rotation of the drive shaft 50, the entire reciprocating subassembly moves to the raised position shown in dotted lines in FIG. 4 and solid lines in FIG. 8. When moved to this position, coiled springs 130 surrounding the posts 70 and 72 are compressed as depicted in FIG. 8. As the drive shaft 50 continues to move through its 360° cycle, the cam 122 returns to its lowered position shown in FIG. 7 to bring the lower end 64a of the indexing finger 64 into engagement with the trailing lip X of the pan B.

OPERATION

The machine 10 of this invention is actuated upon a row of dough packets 20 being advanced one step by the production line. Upon actuation of the machine 10, the reciprocating subassembly 52 moves up and down through one cycle, dwelling momentarily in the lowered position to receive the dough packets 20. A micro switch or electric eye (not shown), for example, may be used to detect this movement of the row of dough packets 20 to energize the clutch 44. When the clutch 44 is energized, the drive shaft 50 moves through one 360° cycle. As the drive shaft 50 turns, the cam 122 presses against the top plate 78 of the reciprocating subassembly 52 to push this subassembly upwardly, causing the the bearing blocks 74 and 76 to slide along the posts 70 and 72 and compressing the coiled springs 130 as illustrated in FIG. 8. FIG. 8 depicts the mid point of the cycle of the machine 10 where the shaft 50 has rotated through 180° of its 360° turn. With continued rotation of the drive shaft 50, the cam holder 112 continues to move the cam 122 to return it to the position illustrated in the FIG. 7, the starting position of the cycle.

With each cycle of the machine 10, the indexing arm 66 is moved from the starting position shown in FIG. 4 to the elevated, mid-cycle position shown in FIG. 9 to allows the table-top conveyer 18 to move the baking pans 16 to the left as shown in FIG. 1. Upon completion of the 360° turn of the drive shaft 50, the indexing arm 66 is lowered, returning it to the starting position and preventing the pan B from being moved so that this pan B is ready to receive the next row of dough packets 20 as they slide down ramp 27. The subassembly 52 reciprocates up and down, with the trailing lip of the pan beneath the subassembly, for example pan B, advancing in a step wise fashion an interval or step equal to the distance between fingers 64. As shown in FIG. 3, the trailing finger 64' first engages the lip X of pan B, then the other fingers 64 sequentially engage this lip X until the leading finger 64" engages the lip X as shown in FIG. 10. With the next 360° turn of the shaft 50, the leading finger 64" is raised, allowing pan B to clear the indexing machine 10 and move rapidly to the next station in the production line. The trailing finger 64' next engages the trailing lip of the pan C. The machine 10 then moves pan C step-wise in the direction indicated by arrow a.

One feature of this invention is that a number of baking pans 16 can be nested together without interfering with the function of the machine 10. If this occurs, the indexing fingers 64 will engage the top pan of the nested pans, moving the entire reciprocating subassembly 52 upward to compress the coiled springs 130. With the next cycle of rotation, the reciprocating subassembly 52 will function in its normal manner notwithstanding the nested pans to raise the indexing arm 66 to the position illustrated in FIG. 9 and lower it once again to a position illustrated in FIG. 10. Upon the nested pans clearing the trailing indexing finger 64', the entire subassembly 52 will then be lowered to its normal position as illustrated in FIG. 7 to engage the next pan, single or non-nested pan.

When the types of pans are to be changed, for example, from producing hamburger buns to loaves of bread, the entire indexer carriage 32 may be raised so that the indexing fingers 64 engage the much higher lip of, for example, the pan for a loaf of bread. When the production run of bread loaves is completed, the indexer carriage 52 may be lowered to accommodate, for example, another run of hamburger buns or hot dog buns.

SCOPE OF THE INVENTION

The above description presents the best mode contemplated of carrying out the present invention. This invention is, however, susceptible to modifications and alternate constructions from that discussed above which are fully equivalent. Consequently, it is not the intention to limit this invention to the particular embodiment disclosed. On the contrary, the intention is to cover all modifications or alternate constructions coming within the spirit and scope of the invention as generally expressed by the following claims:

I claim:

1. An indexing machine for bakery pans comprising
   means for advancing the pans along a predetermined path, said pans having a raised lip and rows of cups which are spaced apart a predetermined distance,
   an arm having a plurality of indexing members which are spaced apart a distance corresponding to the distance between the rows of cups, said indexing members being positioned so that a lower edge of an indexing member engages the lip of the pan as it moves along said path and prevents the pan from moving until the arm is raised,
   mounting means for the arm including subassembly means which moves reciprocally generally at a right angle relative to said path, said subassembly having spring means coupled between the mounting means and the subassembly means that enable the subassembly to change its position relative to said predetermined path and function notwithstanding said lips overlapping, and
   motor means for reciprocally moving the arm, raising and lowering said arm relative to said predetermined path.

2. The machine of claim 1 including means for removably coupling the arm to the motor means so that the arm may be replaced with another arm which has indexing members spaced differently from the arm removed.

3. The machine of claim 1 including manually operable means for setting the position of the lower ends of the indexing members at a desired position relative to the the lip of the pan.

4. In an apparatus for feeding bakery pans along a predetermined path in a step-wise fashion, said pans having rows of cups arranged in series with a lip member disposed about the perimeter of the pan and encompassing the cups, said lips overlapping from time to time as occurs when pans nest,
   conveyor means on which the pans sit, with individual pans being lined up in a row with edges of the pans abutting each other,
   a generally horizontal arm member having mounted thereon a plurality of indexing fingers spaced apart a distance corresponding to the distance between the rows of cups in the pan, said indexing fingers having roller means mounted to the lower ends of the fingers which are adapted to engage the lip of the pan,
   means for removably connecting the arm to motor means which reciprocally raise and lower the arm relative to said predetermined path and momentarily stop for a sufficient period of time to allow the cups to have dough packets deposited therein within a predetermined row of cups, mounting means for the arm including subassembly means which moves reciprocally generally at a right angle relative to said path, said subassembly having spring means coupled between the mounting means and the subassembly means that enable the subassembly to change its position relative to said predetermined path and function notwithstanding said lips overlapping, and manually operable means for setting the position of the lower ends of the indexing members at a desired position relative to the the lip of the pan.

5. The machine of claim 4 including means for removably coupling the arm to the motor means so that the arm may be disconnected and replaced with another arm which has indexing fingers spaced apart a distance that accommodates a different sized pan.

* * * * *